United States Patent [19]

Duddy et al.

[11] 4,315,829
[45] Feb. 16, 1982

[54] METHOD OF PREPARING A BATTERY PASTE CONTAINING FIBROUS POLYFLUOROETHYLENE FOR USE IN THE PLATES OF A LEAD-ACID STORAGE BATTERY

[75] Inventors: Joseph C. Duddy, Trevose, Pa.; Francis P. Malaspina, Raleigh, N.C.; William J. Martini, Fairless Hills, Pa.

[73] Assignee: Exide Corporation, Philadelphia, Pa.

[21] Appl. No.: 872,870

[22] Filed: Jan. 27, 1978

[51] Int. Cl.³ .............................................. C08L 27/18
[52] U.S. Cl. ............................ 252/182.1; 260/29.6 F; 429/217
[58] Field of Search ................. 260/29.6 F; 252/182.1; 429/217

[56] References Cited

U.S. PATENT DOCUMENTS

| | | | |
|---|---|---|---|
| 3,099,586 | 7/1963 | Duddy | 136/43 |
| 3,184,339 | 5/1965 | Ellis | 64/104 |
| 3,228,796 | 1/1966 | Barak et al. | 29/623.1 |
| 3,385,736 | 5/1968 | Deibert | 136/120 |
| 3,419,900 | 12/1968 | Elmore et al. | 136/86 |
| 3,429,750 | 2/1969 | Waters | 136/120 |
| 3,451,856 | 6/1969 | Frasse et al. | 136/120 |
| 3,466,193 | 9/1969 | Hughel | 29/211 |
| 3,467,612 | 9/1969 | Gagliardi | 260/29.6 F |
| 3,630,781 | 12/1971 | Rampel | 136/31 |
| 3,666,563 | 5/1972 | Paramus | 136/120 FC |
| 3,898,099 | 8/1975 | Baker et al. | 136/75 |

*Primary Examiner*—Maurice J. Welsh
*Attorney, Agent, or Firm*—Woodcock, Washburn, Kurtz, Mackiewicz & Norris

[57] ABSTRACT

A method of preparing a battery paste for a lead-acid storage battery comprising: (a) mixing a water dispersion of polyfluoroethylene with lead material, (b) adding an aqueous solution of sulfuric acid to the lead material-dispersion mix and mixing to form a paste having fibrillation developed therein, (c) controlling the amount of fibrillation developed in the paste, and (d) controlling the paste density for use in a battery plate. The method provides an improved paste which permits substantial reduction in plate weights and density and loss of active material in the grid structure due to plate shedding over a conventional lead-acid paste. The saving in active material ranges from 10 to 30% over a conventional lead-acid paste without reduction in battery performance.

11 Claims, 6 Drawing Figures

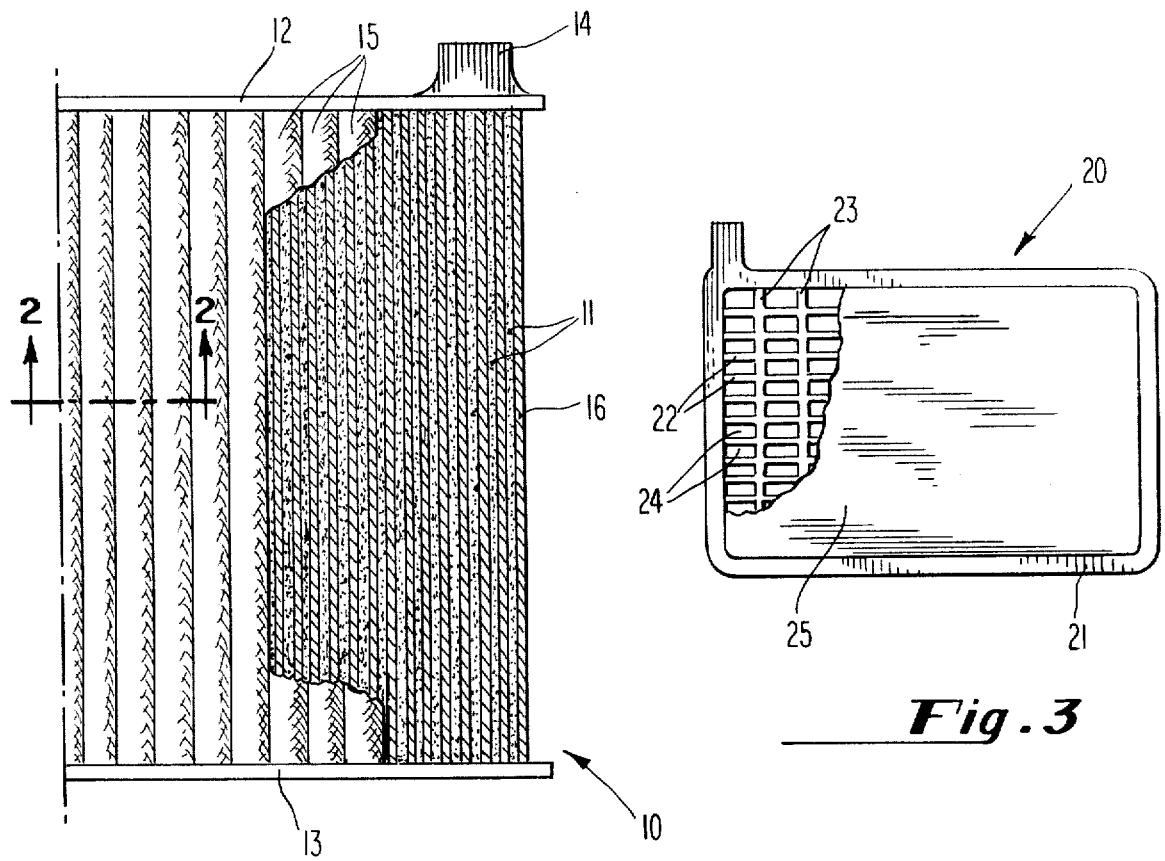
Fig. 1
Fig. 3
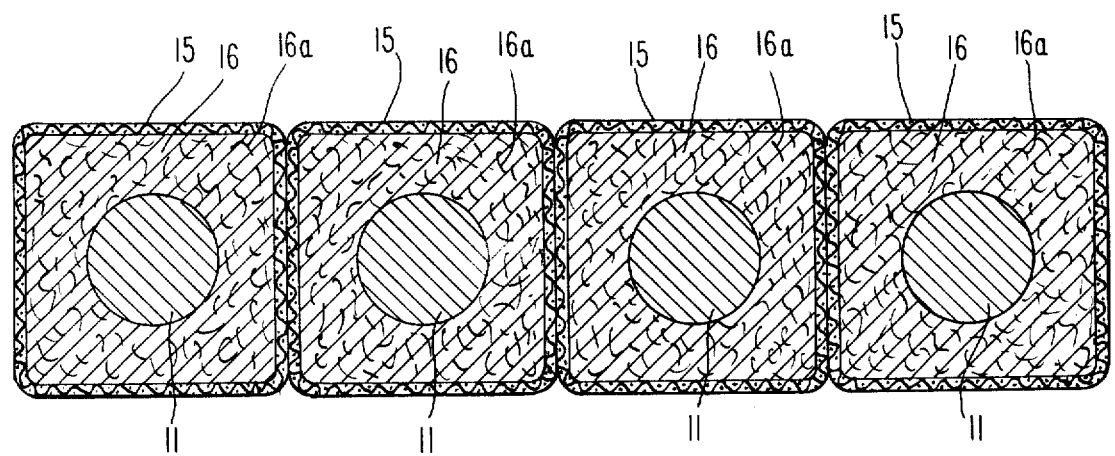
Fig. 2

METHOD OF PREPARING A BATTERY PASTE CONTAINING FIBROUS POLYFLUOROETHYLENE FOR USE IN THE PLATES OF A LEAD-ACID STORAGE BATTERY

FIELD OF THE INVENTION

This invention relates to a method of preparing a battery paste containing fibrous polyfluoroethylene for use in the plates of a lead-acid storage battery and battery plates containing said paste. The present invention is not only applicable to the manufacture of pasted of Faure type flat plates for lead-acid batteries but is also applicable to the manufacture of tubular type plates. The paste is useable in both positive and negative plates but the composition and density (i.e. cube weight) of the active material of the plates will vary somewhat, as is well known in the art.

BACKGROUND OF THE INVENTION

Pastes commonly used in making lead-acid pasted-plate batteries are prepared by mixing an active material comprising finely divided lead oxide or a blend of oxides which may contain metallic lead in powder form and/or other additives with an aqueous solution of sulfuric acid, i.e., a dilute solution of sulfuric acid. This produces reactions that result in the formation of lead sulfate and the liberation of heat. The quantity of heat generated, of course, depends upon the rate of addition of the acid and the specific gravity (Sp.Gr.) of the dilute solution of sulfuric acid. The lead sulfate expands the paste, i.e. produces "bulking", which has an important effect on the operating characteristics of the finished battery; too little expansion results in hard, dense plates which limit the amperehour capacity of the battery. Frequently this causes the battery to fail in service by buckling of the positive plates, or sulfation of the negative plates. Alternatively, too great expansion of the paste results in shedding of the positive active material thus shortening the useful life of the battery. To provide for consistency of the paste during manufacture, it is customary to control the wet density or "cube weight" of the paste used in the plates. The term "cube weight" refers to the grams per cubic inch, i.e. $g/in^3$, of wet paste. While this varies with the processes used by different manufacturers in lead-acid batteries it normally is within the range of 60 to 75 grams per cubic inch for positive plate pastes and about 65 to 80 grams per cubic inch for negative plate pastes.

Experience has shown that the ampere-hour capacity of lead-acid batteries increases, i.e. the efficiency of the electrically formed active mass rises, with an increase in the amount of sulfuric acid and/or water used in the preparation of the paste. This increases the porosity and thus the surface area of the active mass. However, the more sulfuric acid that is added the more difficult it becomes to mix the paste because of localized overheating and, in addition, the formed active mass becomes so expanded and loose as to result in shedding of the active material thereby shortening the useful life of the battery. Thus in conventional paste manufacturing processes either the capacity or useful life of the battery had to be reduced. Similar difficulties have been encountered in the preparation of the active mass in tubular battery plates.

To overcome the foregoing difficulties it has heretofore been proposed to add fibrous or other bonding materials to storage battery active materials. Numerous plastic type bonding materials such as polyethylene, polypropylene, polystyrene and polyvinylchloride have been disclosed as for example in U.S. Pat. Nos. 3,099,586 3,184,339 and 3,228,796. Preformed fibers of such materials as well as polyester, glass and carbon have also been added to battery paste mixes. In U.S. Pat. No. 3,466,193 there is disclosed the use of lead fibers and "Dynel" fibers, an acrylonitrile-vinyl chloride copolymer, in a lead-acid battery paste mixture.

Linear fluorocarbon polymers or polyfluoroethylene and in particular polytetrafluoroethylene have been added to fuel cell electrodes because of their non-wetting properties. According to one typical prior art electrode forming technique, a fluorocarbon polymer may be incorporated in a cell plate by mixing the polymer with a particulate active material to form an aqueous paste. Since fluorocarbons are hydrophobic, this is accomplished by first dispersing the fluorocarbon in an aqueous solution containing a minor amount of a surface active agent usually less than 5% by weight. The surfactant allows the polymer to be uniformly dispersed in the water, so that in the pasty mixture of water surfactant, active material particles and polymer, the latter is uniformly distributed. The aqueous paste is spread onto a current collector to form a cell plate and the cell plate is then heated to drive off the water. After drying is completed, the cell plate is then heated to a temperature at or near which the polymer sinters. This performs the dual functions of decomposing the surfactant to drive it from the cell plate and sintering the polymer to give it a permanent set. Examples of this technique are disclosed in U.S. Pat. Nos. 3,419,900 and 3,385,736.

In another technique, also commonly practiced in forming electrodes, the active material may be first associated with the current collector which acts to hold the electrode material into a coherent body and the body is then impregnated with an aqueous dispersion of the fluorocarbon polymer. Drying and/or sintering are accomplished in the same manner. An example of this technique is disclosed in U.S. Pat. No. 3,451,856.

In U.S. Pat. No. 3,630,781 there is disclosed a process of forming rechargeable electrodes utilizing unsintered fluorocarbon binder. Polytetrafluoroethylene (PTFE) in an aqueous dispersion ("Teflon"-30) is mixed with a finely divided electrochemically active rechargeable electrode material, such as zinc, zinc-oxide, cadmium, cadmium-oxide, nickel-oxide, copper, copper-oxide, silver, silver-oxide or mercuric-oxide to form a paste. The aqueous dispersion is then broken by various means including drying at a temperature which does not exceed the boiling point of the aqueous carrier, freezing, solvent extraction or by increasing the pH of the carrier, as by introducing an alkaline reagent. In irreversibly breaking the dispersion of the PTFE, the PTFE becomes coagulated into nonsintered fibrous strands which are left within the paste to act as a binder.

In U.S. Pat. No. 3,666,563 there is disclosed a process for fabricating a fuel cell electrode which includes producing heat, in situ, sufficient to soften "Teflon" or some other polymeric thermoplastic suitable for forming adhesive particle-to-particle bonds. The process may be used to bond together the catalyst-containing particles of fuel cell electrodes described in U.S. Pat. No. 3,429,750. In the process, phosphoric acid or any acid having an ionization constant equal to or less than the second ionization constant of phosphoric acid is added to a mixture of electrode components, including supported catalyst-containing particles, a material exothermally reactive with the acid, and a polymeric thermoplastic such as "Teflon". Initially, upon addition of the acid to the mixture, some water is formed and some heat is given off by the reaction between the most readily ionizable hydrogen ions of the acid and a minor portion of the exothermally reactive material, but, the heat is insufficient to cause the polymeric thermoplastic to soften. The acid mixture is then heated to a temperature sufficient to set off a reaction between the acid and the exothermally reactive material, causing the polymeric thermoplastic, as stated in the patent, to become fluid and adherent thus bonding the catalyst-containing particles together. The heated mixture is then subjected to pressure to further bond the components together to form a fuel cell electrode.

In U.S. Pat. No. 3,898,099 there are disclosed battery electrode structures comprising unsintered polytetrafluoroethylene and active material wherein the polytetrafluoroethylene constitutes from 0.1 to 3% of the combined weight of the polytetrafluoroethylene and the active material. The electrodes are formed from a blend including powdered active material and dry powdered polytetrafluoroethylene with about 100-900% by weight excess lubricant such as mineral spirits. In one example, lead oxide and from 0.1 to 1% polytetrafluoroethylene powder are mixed with excess mineral spirits and filtered. The filtered mix is then worked by rolling for 30 minutes. The lead oxide-polytetrafluoroethylene mix is then pressed on an expanded metal grid and thereafter pressed at two tons, repressed and air dried. The electrode was discharged against a lead anode in sulfuric acid.

While known prior art methods have reduced the density of battery active material which resulted in improved utilization of active material, they have left something to be desired because they always resulted in a decreased life. In the present invention the paste density is decreased, the active material utilization is increased and the life of the resulting battery plates is at least equivalent to or greater than plates made with standard density paste.

SUMMARY OF THE INVENTION

Accordingly, a general primary objective of the present invention is (1) to provide a new and improved method of preparing a battery paste containing polyfluoroethylene and a lead material for use in plates of lead-acid storage battery wherein both the amount of fibrillation developed in the paste and the paste density are controlled so that the saving in active material ranges from 10 to 30% over a conventional lead-acid paste without reduction in battery performance (2) as well as to provide a new and improved battery paste for use in plates of a lead-acid storage battery comprising a mixture of lead materials, a fibrous polyfluoroethylene binder and water, wherein the polyfluoroethylene binder is within the range of about $\frac{1}{8}$% to about 5% by weight of the initial lead material utilized to make the paste, which new and improved paste provides substantial reductions in plate weights and density and loss of active material in the grid structure due to plate shedding over a conventional lead-acid paste. To this end, the invention includes (1) a method of preparing a battery paste for use in the plates of a lead acid storage battery which comprises the steps of: (a) mixing a water dispersion of polyfluoroethylene with lead material; (b) adding an aqueous solution of sulfuric acid to the lead material-dispersion mix and mixing to form a paste having a reticulated structure developed by fibrillation of the polyfluoroethylene particles, (c) controlling the amount of fibrillation developed in the paste, and (d) controlling the paste density for use in a battery plate; and (2) a battery paste for use in plates of a lead-acid storage battery produced by such method and a battery plate for a lead-acid storage battery, said plate having a paste thereon produced according to such method.

A specific primary objective is to provide such method of preparing a battery paste wherein the amount of fibrillation developed in the paste is controlled by the temperature developed during step (b) and the amount of shear imparted to the paste.

Another specific primary objective is to provide such method wherein the paste temperature is controlled by controlling the quantity of acid and its rate of addition to the paste. Another specific primary objective is to provide such process wherein the amount of shear imparted to the paste is controlled by varying the time of at least one of the aforesaid steps (a) and (b) in relation to the viscosity of the mix.

A further specific primary objective is to provide such process wherein the polyfluoroethylene is polytetrafluoroethylene within the range from about $\frac{1}{8}$% to about 5% by weight of the weight of the lead material and the water ranges from about 80 cc to about 160 cc per lb. of lead material, the amount of sulfuric acid solution (Sp. Gr. 1.400) ranges from about 25 cc to about 75 cc per lb. of lead material, the temperature of the paste mix is controlled within a range from about 20° C. to about 100° C., the total time of mixing in the aforesaid step (a) ranges from about 5 minutes to about 20 minutes, the total time of mixing in the aforesaid step (b) ranges from about 6 minutes to about 25 minutes and wherein the addition of the sulfuric acid solution during step (b) takes place during approximately 4 to 15 minutes. While the preferred concentration and volumes of the sulfuric acid solution are given above, the sulfuric acid solution concentration and volumes utilized can be varied as is known to those skilled in the art. If the specific gravity of the sulfuric acid is reduced below 1.400, e.g., to 1.350 then the range of acid to lead material must be increased appropriately.

DESCRIPTION OF THE DRAWINGS

FIG. 1 is an elevational view of a tubular battery plate including a paste embodying the present invention;

FIG. 2 is a cross-sectional view along the lines 2—2 in FIG. 1;

FIG. 3 is an elevational view of a flat type battery plate with portions broken away for clarity and including a battery paste embodying the present invention;

DESCRIPTION OF THE PREFERRED EMBODIMENTS

Figure 4:
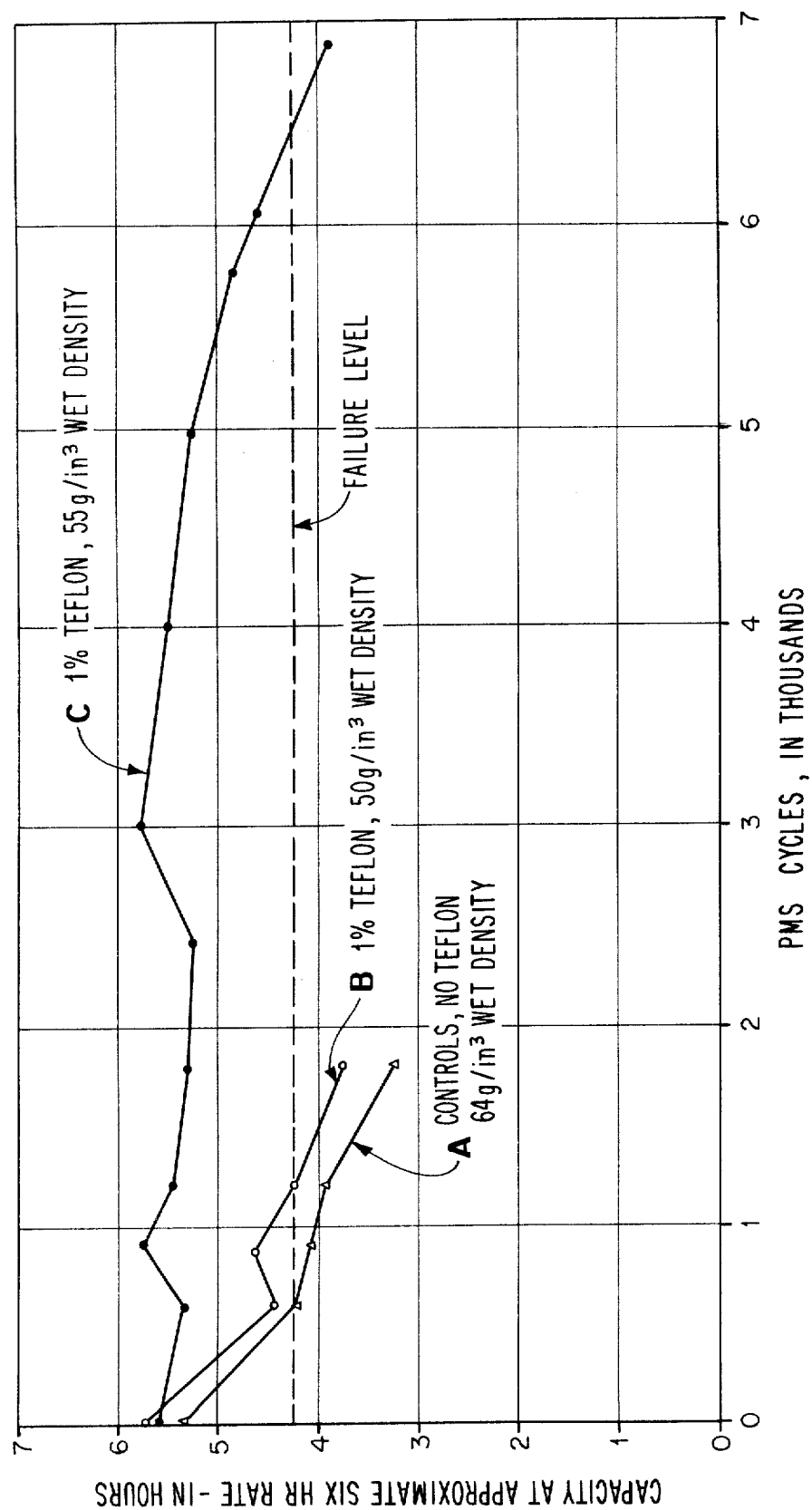
FIG. 4 is a graph illustrating flat plate positive material shedding life on accelerated life test.

As utilized herein the terms lead materials and polyfluoroethylene have the following definitions. The term lead material suitable for use in the present invention includes a lead oxide which is a mixture of lead oxide, commonly called litharge, ObO, and free lead, Pb, in finely divided form as well as other lead battery-active materials including but not limited to massicot, PbO, lead dioxide, $PbO_2$, red lead, commonly called minimum, $Pb_3O_4$, lead sulfate, $PbSO_4$ or mixtures of these materials. Polyfluoroethylene emulsions suitable for use in the present invention include the family of fluorocarbon resin dispersions which have the ability to fibrillate such as those marketed under DuPont's registered trademark "Teflon" including polytetrafluoroethylene. A preferred form is the "Teflon" water dispersion identified as "Teflon" 30 TFE resin aqueous dispersion which contains approximately 60% solids (by weight) and is stabilized with 5.5 to 6.5% (based on the weight of the resin) of non-ionic wetting agent.

The present invention provides a new process for making lead oxide battery paste designed to increase plate cycle life and using polytetrafluoroethylene as a binder to retain the active material. The lead oxide paste containing about ⅛ to 5% "Teflon" 30 dispersion has shown a substantial decrease in positive plate shedding during cycling. The loss of active material contact and eventually a shedding of this material is the cause of battery failure in many applications. The "Teflon" dispersion is added to the oxide with the initial water prior to the addition of acid. The addition of "Teflon" dispersion has allowed the reduction of paste density substantially over conventional lead-acid paste normally required for use in battery plates and has decreased plate weights by approximately 10% to 30% without sacrificing performance or life.

The following is a description of a general procedure for making a positive paste in accordance with the present invention. The leady active material may include any one or more of the above previously described materials. Specifically, the lead material may comprise a powder such as a leady oxide (nominally 75% PbO, 25 Pb) available in the trade. The water ($H_2O$) utilized in making the paste can range from about 80 to 160 cc per lb. of leady oxide. The sulfuric acid solution (specific gravity 1.400) ranges from about 25 to about 75 cc per lb. of leady oxide. The polytetrafluoroethylene ("Teflon" 30dispersion) ranges from 5% down to about ⅛% by weight based on the weight of leady oxide.

In a laboratory procedure for making the "Teflon" positive paste the normal amount of leady oxide used was 20 lbs. On a production line basis the mixes would be in the order of 2,400 lbs. The $H_2O$ and $H_2SO_4$ ingredients are varied through the ranges stated above so as to provide a desired value of density and plasticity (viscosity) in the finished paste mix. The "Teflon" ranges are from ⅛% to 5% and provide the desired amount of fibrillation in the paste and normally the lower end of the range is preferred.

In practicing the process of the present invention dry leady oxide powder is added to a mixer and the mixer started. The mixer preferably is of the sigma blade type having an external water line that can be used either for heating or cooling. The "Teflon" dispersion and water are blended together in a large container and then added to the mixer over a period of about 2 minutes. The water and "Teflon" and oxide mixture is then allowed to mix in the mixer for from 5 to 10 minutes. At this time the sulfuric acid addition is started. In batches when the amount of water per lb. of oxide is at the high end of the range, the mixing of the water and "Teflon" and oxide mixture is extended for an additional 5 or 10 minutes before the start of the acid addition. With the mixer still operating, the sulfuric acid is added gradually by gravity flow such as by a lead "sprinkler" pipe mounted over the mixer. The time for the acid addition is generally about 4 to 6 minutes. Towards the end of this period fibrillation of the polytetrafluoroethylene in the paste will become visible. After the acid addition, the mixer is stopped and the paste temperature is measured. This reading is known as the "peak temperature". The paste is examined visually at which time a determination is made as to how much more mixing time will be needed to develop the desired fibrillation. It is usual to provide 3 minutes mixing after the end of the acid addition but this may be extended to 5 to 10 minutes to facilitate fibrillation.

The amount of fibrillation developed in the paste is dependent on the temperature developed during the mixing procedure and the amount of shear imparted to the paste. A critical temperature range, particularly for Teflon mixes below about 1%, is about 43° C. to about 70° C. below which it is difficult to develop fibrillation and above which the paste becomes difficult to use. The paste temperature is controlled by adjusting the temperature of the water in the external line of the mixer and by controlling the rate of acid addition to the paste. The amount of shear is controlled by varying the time of mixing after the water and Teflon addition and after the acid addition in relation to the viscosity of the particular mix.

A measurement is made of the paste density and paste plasticity. Minor additions of acid or water in the order of 1 to 5 cc per lb. may be needed to adjust density or plasticity. If any final liquid is added, the paste is mixed for about an additional 3 minutes. The paste is now ready for use and can be used interchangeably in pasted type flat plates or to fill tubular plates.

Tubular plates are utilized in tubular lead-acid storage batteries which derive their name from the plate design. A tubular plate normally comprises a plurality of conductive lead alloy spines in porous tubes filled with active material lying side by side and connected together on each end to form a plate. This plate design is sometimes known as the "IRONCLAD" plate, a product of ESB Incorporated. An illustration of a tubular battery plate is shown in FIGS. 1 and 2, wherein the tubular plate 10 includes a plurality of conducting spines 11 secured on either end to a top bar 12 and a bottom bar 13. A lug 14 extends from the top bar 12 to provide a point of connection for interconnecting the various plates of the lead-acid tubular battery. A porous tube 15 surrounds each spine 11 and confines the active material 16 in the annular space between spines 11 and the inside of tube 15. As may be seen in FIG. 2 the active material 16 diagrammatically illustrates the novel battery paste of the present invention with the fibres 16a diagrammatically illustrating the fibrillated polytetrafluoroethylene.

A typical flat plate embodying the novel battery paste of the present invention is illustrated in FIG. 3. The plate 20 has an external grid frame 21 with horizontal conductors 22 and vertical conductors 23 extending between the sides of the grid frame 21 to define openings 24. The novel active material paste 25 is pasted on the grid during construction of the plate and fills the openings 24. The paste 25 includes fibrillated polytetrafluoroethylene fibers the same as the paste 16 illustrated in FIG. 2.

The following examples further illustrate the practice of the present invention.

EXAMPLES 1 and 2

Mixes were made having different densities for comparison test purposes, as follows:

|  | 1 | 2 |
|---|---|---|
| Lead material | 16 lb. leady oxide 4 lb. red lead | 16 lb. leady oxide 4 lb. red lead |
| "Teflon" 30TFE dispersion | 150 gm. | 150 gm. |
| H₂O | 2200 ml | 1800 ml |
| H₂SO₄ (1.400 Sp. Gr.) | 600 ml | 500 ml |
| % "Teflon" by weight of lead material | 1% | 1% |
| Wet paste density | 50 g/in³ | 55 g/in³ |
| Peak temperature | 60° C. | 63° C. |

The pastes in Examples 1 and 2 were mixed as follows:

A total of 20 lbs. of lead material was placed in a mixer and the mixer started. In a separate container, the "Teflon" 30 TFE dispersion was mixed with water. The diluted "Teflon" 30 TFE dispersion was then added to the lead material and mixed for about 15 minutes. After the lead material-dispersion mix was completed, the sulfuric acid solution was added to the lead material-dispersion mix during a period of approximately 4 to 6 minutes. The mixing was continued for approximately 2 minutes after completion of the acid addition to develop the desired amount of fibrillation in the paste. The density of the paste was then adjusted to a density of 50 to 55 grams per cubic inch. The resulting lead-acid battery paste contained 1.0% Teflon. The paste was pasted into storage battery grids to produce pasted type flat plates. These plates were similar to plate 20 shown in FIG. 3. To determine the effect of the addition of "Teflon" at different paste densities on plate cycle life, an accelerated life test was initiated on these plates. This test is used to quickly evaluate shedding characteristics of positive paste. It is also applicable to negative paste plates. The cell design and cycle regime cause rapid positive plate failure from active material shedding. Test cells were constructed using two negative plates and one positive plate. They are separated using 4.572 mm diameter glass rods. This assembly permits the active material to fall freely into the cell sediment space during cycling. The test, PMS, consisted of continuous cycles of charge and discharge with the plates being on charge for 25 minutes followed by a 5 minute discharge.

Plates made according to Examples 1 and 2 were tested against a control flat plate of conventional lead acid construction and having a density of 64 grams per cubic inch. In FIG. 4 there is illustrated a graph showing the curves obtained from the accelerated life test on battery plates made according to Examples 1 and 2 and conventional battery plates. In FIG. 4 ampere-hours is plotted against the number of cycles. The failure level is indicated at 80% of the original 6 hour capacity of the control plate. The performance of the control plate is indicated by curve A. Failure occurred at approximately 600 cycles. Plates including a paste made according to Example 1 are illustrated by curve B and it will be seen that these plates did not reach failure level until 1200 cycles. The paste in these plates contains 1% "Teflon" and has a density of 50 grams per cubic inch. Plates having a paste made according to Example 2 had a cycle life more than ten times as long as the conventional control plates. This is illustrated by curve C where the paste contains 1% "Teflon" and a density of 55 grams per cubic inch. Plates having this type paste did not reach the failure level until about 6500 cycles.

Additional tests were conducted on flat plates having pastes made according to the following Examples 3–8.

EXAMPLE 3

| Lead material | 1814 gms leady oxide |
|---|---|
| "Teflon" 30 TFE dispersion | 15 gms |
| Water (initial) | 180 ml |
| H₂SO₄ (1.400 Sp. Gr.) | 140 ml |
| Water (final) | 220 ml |
| % "Teflon" by wt. of lead material | 0.5% |
| Wet paste density | 57.5 gm/in³ |
| Plasticity | .520 in. |

EXAMPLE 4

| Lead material | 1814 gms leady oxide |
|---|---|
| "Teflon" 30 TFE dispersion | 30 gms |
| Water (initial) | 210 ml |
| H₂SO₄ (1.400 Sp. Gr.) | 140 ml |
| Water (final) | 200 ml |
| % "Teflon" by wt. of lead material | 1.0% |
| Wet paste density | 54.5 gm/in³ |
| Plasticity | .480 in. |

EXAMPLE 5

| Lead material | 1814 gms leady oxide |
|---|---|
| "Teflon" 30 TFE dispersion | 60 gms |
| Water (initial) | 220 ml |
| H₂SO₄ (1.400 Sp. Gr.) | 140 ml |
| Water (final) | 175 ml |
| % "Teflon" by wt. of lead material | 2.0% |
| Wet paste density | 57.5 gm/in³ |
| Plasticity | .350 in. |

Plates containing pastes made according to Examples 3, 4 and 5 were placed in test cells as described above and subjected to the accelerated life test. The cycling continued for a period of 6 weeks, accumulating over 2,000 cycles. During this time, the control plate sediment space accumulated enough active material to cause plate shorting across the bottom of the cell. The plates made with the paste of Example 3 containing 0.5% "Teflon" showed some accumulation, the plates having the paste of Example 4 containing 1.0% "Teflon" showed less accumulation and plates having the paste of Example 5 containing 2% "Teflon" showed almost no accumulation. A six hour rate capacity check after 2,000 cycles for plates containing pastes of Examples 3, 4 and 5 as compared to a control flat plate gave the following results to 1.75 volts.

Capacity at 2000 PMS Test Cycles

| Control Plate | 3.3 Hr. |
|---|---|
| Paste #3 0.5% Teflon | 4.2 Hr. |
| Paste #4 1.0% Teflon | 6.1 Hr. |

-continued

| Paste #5 2.0% Teflon | 7.6 Hr. |
|---|---|

An examination of the above test plates showed a 40% loss of active material from the control plate exposing the grid metal on both sides. The test plate of Example 3 containing 0.5 "Teflon" lost some active material but plates using 1% and 2% "Teflon" (Examples 4 and 5) lost no active material.

EXAMPLE 6

| Lead material | 25 lbs leady oxide |
|---|---|
| "Teflon" 30 TFE dispersion | 93.75 gms |
| Water (initial) | 1125 ml |
| H$_2$SO$_4$ (1.400 Sp. Gr.) | 875 ml |
| Water (final) | 1250 ml |
| % "Teflon" by wt. of lead material | 0.5% |
| Wet paste density | 58.5 gm/in$^3$ |
| Plasticity | .430 in. |

EXAMPLE 7

| Lead material | 25 lbs leady oxide |
|---|---|
| "Teflon" 30 TFE dispersion | 187.5 gms |
| Water (initial) | 1325 ml |
| H$_2$SO$_4$ (1.400 Sp. Gr.) | 875 ml |
| Water (final) | 1000 ml |
| % "Teflon" by wt. of lead material | 1.0% |
| Wet paste density | 58.5 gm/in$^3$ |
| Plasticity | .405 in. |

EXAMPLE 8

| Lead material | 25 lbs leady oxide |
|---|---|
| "Teflon" 30 TFE dispersion | 375 gms |
| Water (initial) | 1325 ml |
| H$_2$SO$_4$ (1.400 Sp. Gr.) | 875 ml |
| Water (final) | 725 ml |
| % "Teflon" by wt. of lead material | 2.0% |
| Wet paste density | 58.5 gm/in$^3$ |
| Plasticity | .370 in. |

Figure 5:
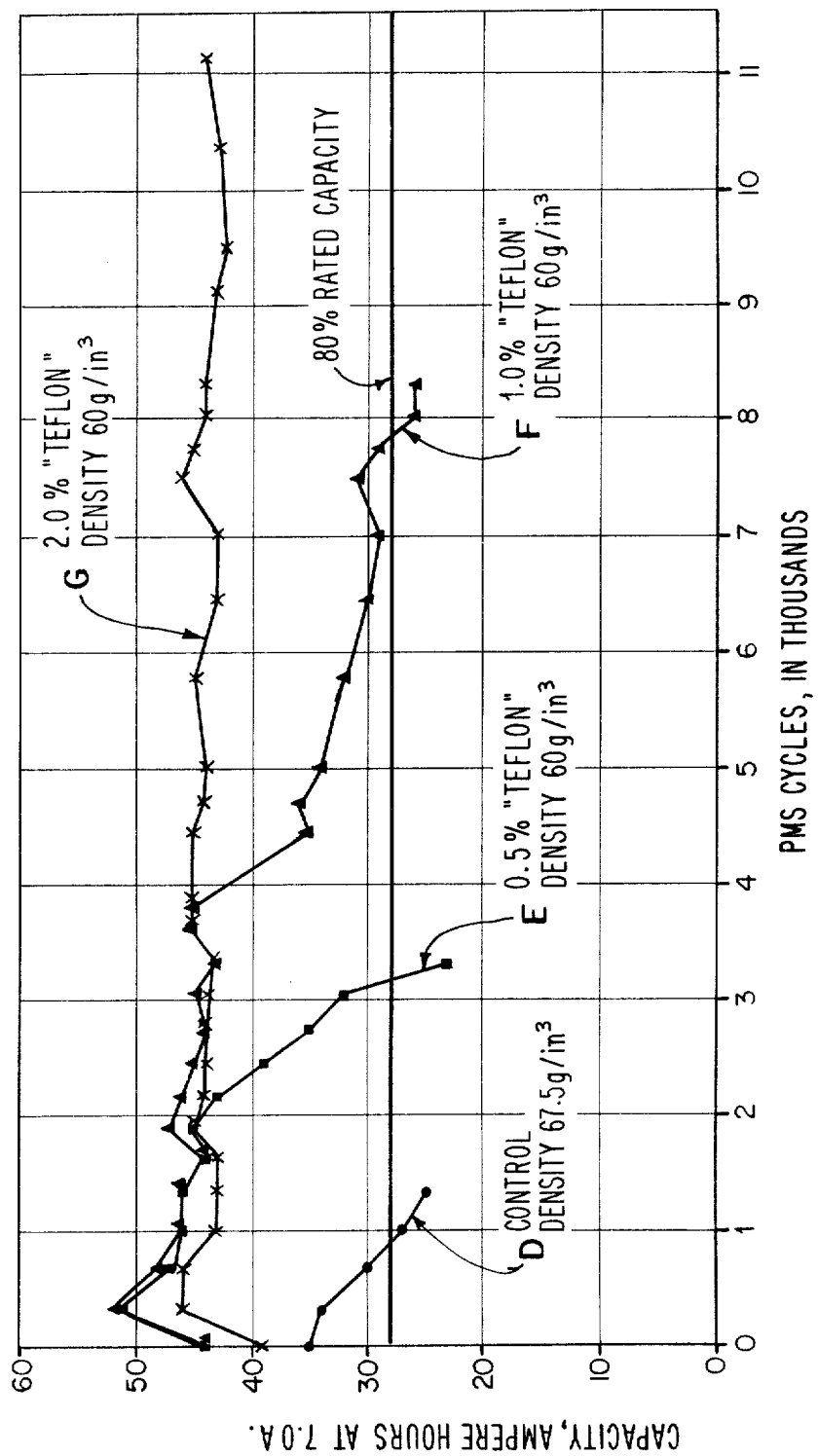
FIG. 5 is a graph illustrating flat plate positive material shedding life on accelerated life test at approximately constant wet paste density and varying composition of polytetrafluoroethylene.

Plates containing pastes made according to Examples 6, 7 and 8 were placed in test cells as described above and subjected to the accelerated life test. The cycling was continued for approximately 8 months, accumulating over 11,000 cycles. In FIG. 5 there is illustrated a graph showing the performance of these plates compared to a conventional battery plate. In this test, the control plate curve D, failed at approximately 1,000 cycles even though 1,500 cycles is considered normal. The plate made with the paste of Example 6, 0.5% "Teflon", curve E failed at approximately 3,200 cycles. The plate made with the paste of Example 7, 1.0% "Teflon", curve F, failed at approximately 7,500 cycles. The plate made with the paste of Example 8, 2.0% "Teflon", curve G was still delivering normal capacity at 11,097 when the test was terminated. These curves show the dramatic influence of increasing "Teflon" concentration on improving the life of flat plates on the PMS test and the improved positive active material efficiencies of the lower density plates made in accordance with the invention.

While the foregoing Examples 1–8 all relate to flat type plates, the following Examples 9 and 10 relate to tubular plates.

EXAMPLE 9

| Lead material | 16 lbs leady oxide |
|---|---|
|  | 4 lbs red lead |
| "Teflon" 30 TFE dispersion | 37.5 gms |
| Water (initial) | 2300 ml |
| H$_2$SO$_4$ (1.400 Sp. Gr.) | 1150 ml |
| % "Teflon" by wt. of lead material | 0.25% |
| Wet paste density | 45 gm/in$^3$ |

EXAMPLE 10

| Lead material | 16 lbs leady oxide |
|---|---|
|  | 4 lbs red lead |
| "Teflon" 30 TFE dispersion | 75 gms |
| Water (initial) | 2300 ml |
| H$_2$SO$_4$ (1.400 Sp. Gr.) | 1150 ml |
| % "Teflon" by wt. of lead material | 0.50% |
| Wet paste density | 45 gm/in$^3$ |

Figure 6:
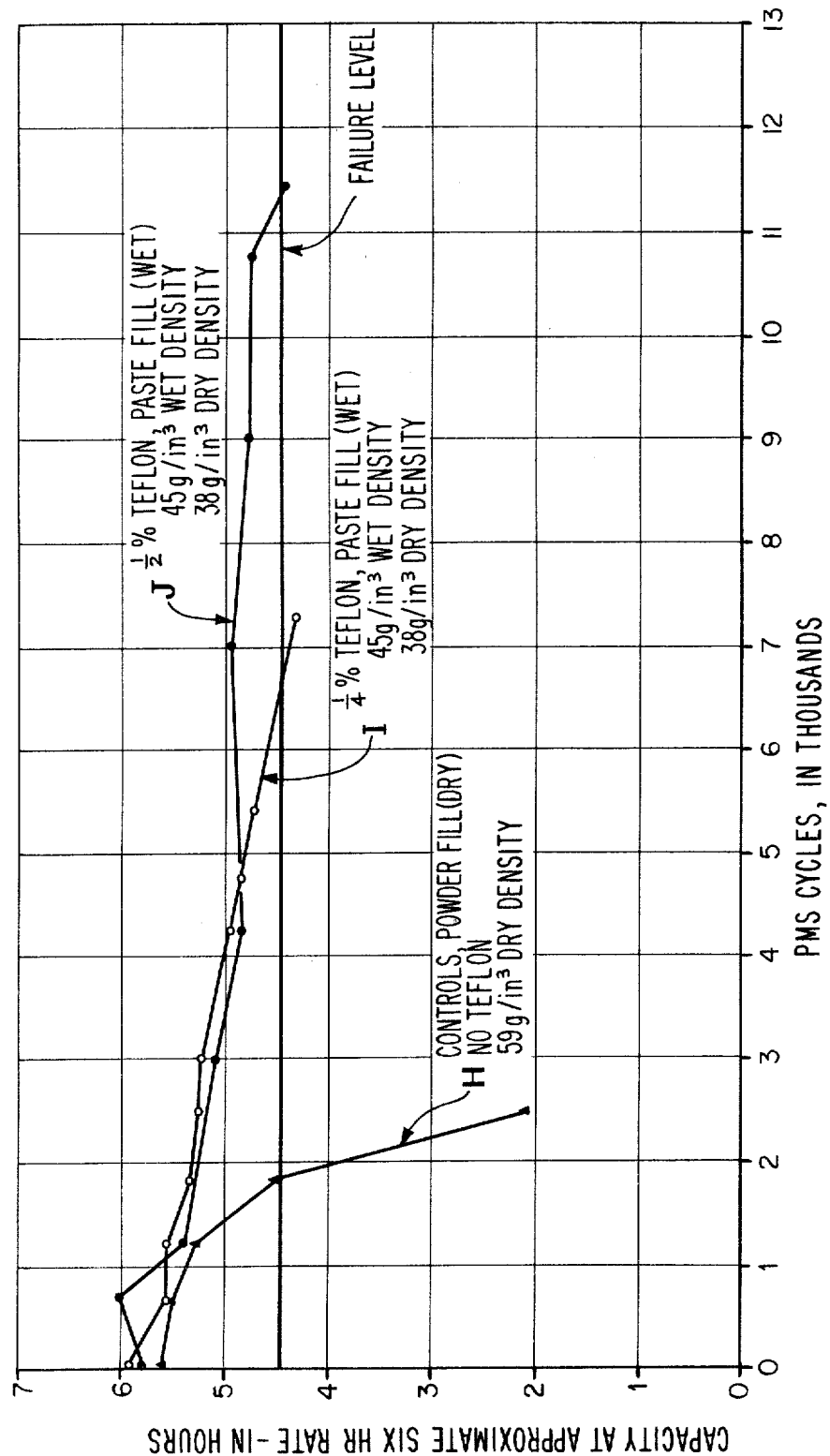
FIG. 6 is a graph illustrating tubular plate positive material shedding life on accelerated life test.

In Examples 9 and 10 battery pastes according to the present invention were prepared using $\frac{1}{4}$% "Teflon" and $\frac{1}{2}$% "Teflon" mixes respectively. However, the density was held the same for each of Examples 9 and 10, namely, a wet density of 45 grams per cubic inch or a dry density equivalent to 38 gms. per cubic inch. Test cells were constructed utilizing the tubular plates. The tubular plates were placed on an accelerated life test to show the effect of positive material shedding. The tests consisted of continuous cycles of charge and discharge. The tubular plates utilizing a paste made according to Examples 9 and 10 were tested against a control tubular plate of conventional lead acid construction and having a dry density of about 59 grams per cubic inch. In FIG. 6 there is illustrated a graph showing the curves obtained from the accelerated life tests on tubular battery plates made according to Examples 9 and 10 and a control tubular plate.

FIG. 6 is similar to FIG. 4 in that the capacity in ampere hours is plotted against the number of cycles for the plates. The failure level is indicated at 80% of the original six hour capacity of the control plate. Curve H in FIG. 6 illustrates the accelerated life test on conventional tubular plates used as the "control" plates. It will be noted that the control plates reached the failure level at 1800 cycles. Tubular plates including a paste made according to Example 9 are illustrated by curve I and it will be seen that these plates did not reach the failure level until about 6,750 cycles. The paste in these plates contained $\frac{1}{4}$% "Teflon" and had a wet density of 45 grams per cubic inch. Plates having a paste made according to Example 10 had a PMS cycle life more than five times as long as the conventional control plates. This is illustrated by curve J where the paste contains $\frac{1}{2}$% "Teflon" and a wet density of 45 grams per cubic inch. Plates having this type paste did not reach the failure level until about 11,250 cycles.

From the foregoing it will be seen that the present invention overcomes the problems of the prior art without resulting in decreased battery life. In the present invention the paste density is decreased, the active material utilization is increased and the life of the resulting battery plates is at least equivalent to or greater than plates made with standard density paste.

What is claimed is:

1. A method of preparing a battery paste for use in the plates of a lead acid storage battery which comprises the steps of:
   (a) mixing a water dispersion of polyfluoroethylene with lead material,
   (b) adding an aqueous solution of sulfuric acid to the lead material-dispersion mix and mixing to form a paste having fibrillation developed therein,
   (c) controlling the amount of fibrillation developed in the paste by controlling the temperature developed during step (b) within a range from about 20° C. to about 100° C. and the amount of shear imparted to the paste, and
   (d) controlling the paste density for use in a battery plate.

2. The method of preparing a battery paste according to claim 1 wherein the paste temperature is controlled externally of the paste.

3. The method of preparing a battery paste according to claim 1 wherein the paste temperature is controlled by controlling the quantity of acid and its rate of addition to the paste.

4. The method of preparing a battery paste according to claim 1 wherein the amount of shear imparted to the paste is controlled by varying the time of at least one of steps (a) and (b) in relation to the viscosity of the mix.

5. The method of preparing a battery paste according to claim 1 wherein the temperature is controlled within a range from about 43° C. to about 70° C.

6. The method of preparing a battery paste according to claim 1 wherein the polyfluoroethylene is polytetrafluoroethylene within the range of from about $\frac{1}{8}$% to about 5% by weight of the weight of the leady active material and the water ranges from about 80 cc to about 160 cc per pound of leady active material, and the acid has a specific gravity of 1.400 and ranges from about 30 cc to about 75 cc per pound of lead material.

7. The method of preparing a battery paste according to claim 1 wherein the total time of mixing in step (a) ranges from about 5 minutes to about 20 minutes.

8. The method of preparing a battery paste according to claim 1 wherein the total time of mixing in step (b) ranges from about 6 minutes to about 25 minutes.

9. The method of preparing a battery paste according to claim 1 wherein the addition of the aqueous solution of sulfuric acid during step (b) takes place during approximately 4 to 15 minutes.

10. A battery paste for use in plates of a lead acid storage battery comprising a mixture of leady active material, fibrous polyfluoroethylene and water, wherein the polyfluoroethylene is within the range of about $\frac{1}{8}$% to about 5% by weight of the initial leady active material utilized to make the paste.

11. A battery plate for a lead acid storage battery, said plate having a paste thereon produced according to the method of claim 1.

* * * * *